United States Patent
Strömmer

(10) Patent No.: US 6,847,040 B2
(45) Date of Patent: Jan. 25, 2005

(54) SENSOR ARRANGEMENT AND METHOD IN DIGITAL X-RAY IMAGING

(75) Inventor: Pekka Strömmer, Espoo (FI)

(73) Assignee: Planmed Oy, Helsinki (FI)

( * ) Notice: Subject to any disclaimer, the term of this patent is extended or adjusted under 35 U.S.C. 154(b) by 0 days.

(21) Appl. No.: 10/221,608

(22) PCT Filed: Mar. 14, 2001

(86) PCT No.: PCT/FI01/00246

§ 371 (c)(1),
(2), (4) Date: Sep. 13, 2002

(87) PCT Pub. No.: WO01/69284

PCT Pub. Date: Sep. 20, 2001

(65) Prior Publication Data

US 2003/0035510 A1 Feb. 20, 2003

(30) Foreign Application Priority Data

Mar. 14, 2000 (FI) ............................................. 20000592

(51) Int. Cl.⁷ ................................................. G01T 1/24
(52) U.S. Cl. .............................. 250/370.09; 250/370.02
(58) Field of Search ....................... 250/370.09, 370.02, 250/370.08, 370.14, 208.1, 580; 378/98.8

(56) References Cited

U.S. PATENT DOCUMENTS

| | | | |
|---|---|---|---|
| 5,528,043 A | * | 6/1996 | Spivey et al. .......... 250/370.09 |
| 5,604,534 A | * | 2/1997 | Hedges et al. .............. 348/144 |
| 5,742,659 A | * | 4/1998 | Atac et al. ................. 378/98.8 |
| 5,757,011 A | * | 5/1998 | Whitebook et al. .... 250/370.09 |
| 5,886,353 A | * | 3/1999 | Spivey et al. .......... 250/370.09 |
| 5,962,856 A | * | 10/1999 | Zhao et al. ............ 250/370.09 |
| 6,353,654 B1 | * | 3/2002 | Granfors et al. .............. 378/62 |
| 6,448,544 B1 | * | 9/2002 | Stanton et al. ........... 250/208.1 |
| 2002/0195566 A1 | * | 12/2002 | Rodricks et al. ....... 250/370.09 |

* cited by examiner

Primary Examiner—Constantine Hannaher
Assistant Examiner—Otilia Gabor
(74) Attorney, Agent, or Firm—Steinberg & Raskin, P.C.

(57) ABSTRACT

A sensor arrangement and method for digital X-ray imaging. The sensor arrangement in digital X-ray imaging includes at least one sensor element which absorbs X-radiation and contains a medium, which has a relatively thin semiconductor material structure, that converts X-ray quanta into electron-hole pairs. The surface of the element opposite to the surface receiving the X-radiation is provided with electrodes for dividing the sensor element into at least two pixel columns. Each pixel electrode is provided with detection electronics and a counter for counting the voltage or current pulses generated by the electron-hole pairs. The counters for adjacent pixel columns are connected to each other so that the counters for the pixels can be loaded from the counter for the corresponding pixel on the same row in the preceding pixel column. The counter may be provided with a circuit for preventing counting after the counter has reached its maximum value, ensuring that overexposure will not produce any other error in the image.

32 Claims, 6 Drawing Sheets

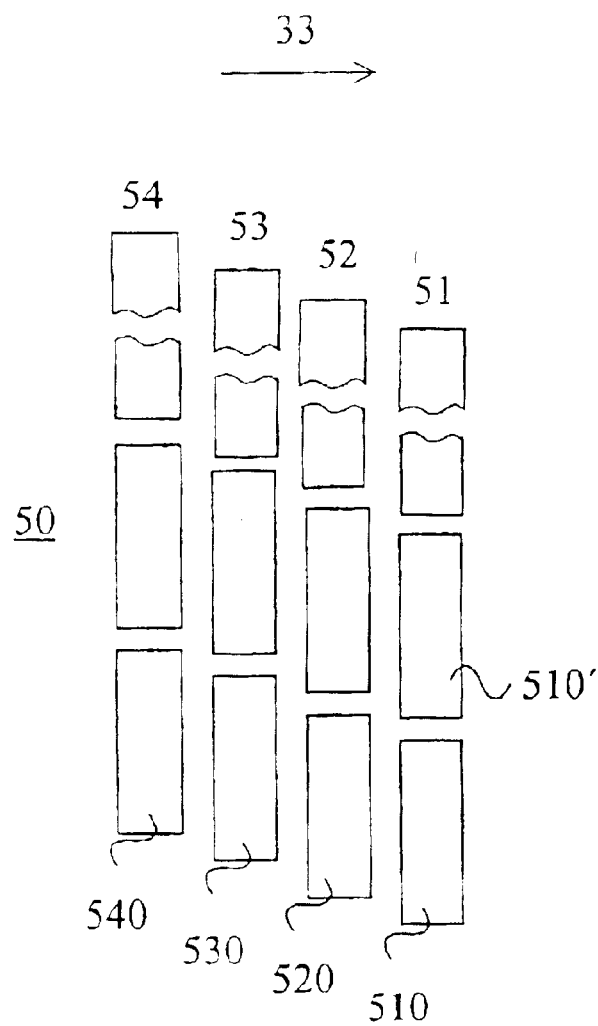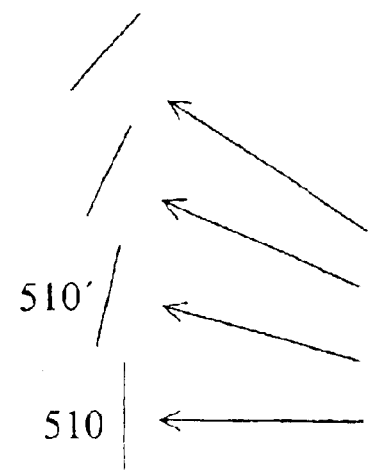
FIG. 5A
FIG. 5B

SENSOR ARRANGEMENT AND METHOD IN DIGITAL X-RAY IMAGING

The present invention relates to a sensor arrangement and method in digital X-ray imaging.

BACKGROUND OF THE INVENTION

About ten years ago, digital X-ray imaging emerged from research units and began to gain ground as a practical imaging method. Ignoring a few exceptions, the earliest digitizing methods were based on a procedure in which X-ray quanta having penetrated the object being imaged were absorbed into a so-called scintillator, which consequently emitted photons, i.e. in a way converted the energy level of the X-ray quanta to a wavelength of light. The photons were subsequently transferred either directly or generally via an optical medium onto a silicon substrate, in which, on being absorbed into the substrate, the photons formed electron-hole pairs, i.e. charges capable of being detected by electrical means. In regard of efficiency, however, such arrangements were relatively modest, and in regard of resolution they were poor because their principle involved the problem of diffusion of photons in the scintillator. On the other hand, as the thickness of the scintillator layer therefore had to be kept rather small, typically at about 10 $\mu$m, another consequence was that a large proportion of the X-ray quanta penetrated the scintillator layer and was absorbed into the optical medium. It could even happen that x-ray quanta were absorbed into the silicon substrate itself, which produced a high level of quantum noise in the image information. Often only about 30% of the X-ray quanta could be utilized in image formation.

With the development of the technology, arrangements as described above have yielded a quantum efficiency (dqe) of over 50%. However, the imaging resolution typically achieved by these type of solutions is still only about 10 lp/mm, after which the MTF (Modulation Transfer Function) describing the resolution begins to fall rapidly, being at a level of only about 30% e.g. at frequencies exceeding 5 lp/mm.

In the traditional scintillator material, an X-ray quantum produces, depending on its energy, about 20 photons/keV in the direction of the silicon substrate used as a detector. A proportion of the photons disappears during the passage through the optical fiber transfer medium. Depending on the magnification produced with the fiber optics, typically 10–70% of the photons disappear, which means that even in a favorable case only about 18 photons/keV can be received at the detector. Using a CCD (charge-Coupled Device) sensor having a light quantum efficiency of about 0.3, approximately 6 electrons/keV can be detected. Thus, with X-radiation with an energy level of e.g. 20 keV, the final signal that can be detected is only about 100 electrons/quantum. When such a technique is used, special care has to be taken in designing the sensor electronics to ensure that no more of the information carried by the quanta having penetrated the object gets lost and that every electron detected gets measured.

In the foregoing, reference was made to a CCD sensor, which is a detector generally used in these type of sensor systems. However, a problem essentially associated with CCD technology is the presence of so-called dark current, which arises from the sensor's own surface creep current, which in the course of time leads to an accumulation of signal in the so-called pixel wells of the CCD sensor. Therefore, even if no radiation falls on the sensor, the dark current produces background fog in the image obtained from the sensor, which is a significant disadvantage especially at low signal levels.

Another typical problem with the CCD technique is overexposure. If there is too much signal energy, the charges will start flowing out from the pixel wells into neighboring pixels. This messes up the image and, at the charge transfer phase of the CCD technique, produces so-called blooming.

In all medical X-ray imaging the aim is to keep the dose of radiation the patient is exposed to as low as possible without compromising on image quality. One of the essential factors in this respect is to obtain a quantum efficiency as high as possible, preferably so that all the X-ray quanta having penetrated the target can be made to contribute to image formation. On the other hand, in respect of image quality, it is in many applications important to achieve a maximal imaging resolution. E.g. in mammography, the detection of small micro-calcifications of a size below 100 $\mu$m is extremely important.

Technological development has led to a new X-ray quanta detection technique in which the low-efficiency light conversion step is left out altogether. In such a technique, the X-ray quanta are absorbed into a medium (e.g. Ge, Si, Se, GaAs, HgI, CdTe, CdZnTe, PbI) in which they are directly converted into electron-hole pairs. When an intensive electric field is applied across such a medium, the charges produced by the absorption of X-ray quanta can be directed toward pixel electrodes in a way that their lateral movement toward adjacent pixels is in practice prevented. Such a technique provides the advantage of allowing the thickness of the X-ray quanta absorbing layer to be increased up to a theoretical quantum efficiency of 100% without any substantial loss of imaging resolution. To achieve such a level of efficiency, e.g. a silicon layer having a thickness of the order of about 3 mm would be needed, but when e.g. ZdZnTe is used, a thickness of about 0.5 mm will be sufficient for the recovery of all X-ray quanta at 20 keV energy level.

However, the new technology as described above also has certain drawbacks which lead to some limitations regarding the possibilities of utilization of this otherwise excellent technique. As the X-ray quanta absorbing layer in any case has to be relatively thick, it must be arranged in a position as perpendicular as possible to the X-ray beam to ensure that the absorption of quanta at different depths will not lead to their being imaged in the areas of different pixels and therefore to a degradation of lateral imaging resolution. Thus, especially for the purposes of medical X-ray imaging, constructing a so-called full-field sensor using this technology is a somewhat dubious enterprise because the resolution of such a sensor is considerably lower in the edge zones than in the central area. As this problem is common to all sensors based on direct absorption that were known before the present invention, their performance has only been measured in the central part of the image area, where the best imaging result is obtained. By contrast, such a technology would be excellently applicable in so-called narrow-beam scanning imaging, where a narrow sensor can be kept substantially perpendicular to the X-ray beam during the entire scanning process. However, to achieve a sufficient signal sensitivity, scanning imaging would require a sensor structure of a width of several pixels and either the utilization of so-called TDI (Time Delay Integration) technology or a signal reading speed that is unattainable by prior-art solutions in present-day technology.

In full-field sensors like those described above, the image information is generally read using reading electronics provided on the surface of an amorphous silicon substrate. Another possible solution is to use a sensor composed of smaller modules and to implement the reading electronics using CMOS (Complementary Metal-Oxide Semiconductor) technology. In both of these techniques, the image information is generally read either after the imaging and sometimes also during it, pixel by pixel, by addressing one pixel at a time and reading the charge accumulated in it from the edge of the sensor. Especially in large sensors, however, there is the problem of the pixel charge being distributed into reading channel capacitances, producing noise in the signal being measured, and, as stated above, even scanning imaging cannot be implemented because it is not possible to reach the required reading speed by means available today.

When X-ray quanta are converted directly into electron-hole pairs, the signal produced is very large, about 200 keV, as compared with conversion into light. Thus, a 20 keV quantum as mentioned above produces a charge of about 4000 electrons instead of 100 electrons, which means that the problems encountered by the sensor electronics are the converse of the traditional problems. This is to say that the signal now obtained is so large that its processing is becoming difficult. To achieve a sufficient gray scale resolution, an information depth of at least 12–14 bits would be required, which in this case would mean a need to process charges of at least 16–65 Me$^-$. Therefore, the use of e.g. CCD sensors in the reading electronics would be practically impossible because the maximum charge they are able to transfer is only about 500 000 e$^-$. Because of the unsuitability of state-of-the-art reading electronics, this type of detector, though especially suited for scanning imaging, is inapplicable for this purpose as the signal cannot be collected even by the known TDI technique utilizing CCD sensors.

Another disadvantage impeding the use of direct conversion sensors is the limited propagation speed of charge elements in absorbing materials currently used, which gives rise to so-called post-luminescence, which in the worst case may continue for as long as several hours. To deal with this phenomenon, artificial compensation has been employed by taking the information of previous images into account and subtracting it as a function of time from the image taken last. However, this method cannot fully correct the error arising as a result of trapped charges drifting with time even laterally into the area of neighboring pixels.

Digital imaging methods used for medical purposes can be divided into two main categories referred to above, full-field imaging and scanning imaging performed using a narrow sensor. Considering the practical imaging process, full-field imaging corresponds to traditional imaging on a film the size of the entire image area. A distinct drawback associated with this technology is the need for large and therefore very expensive sensors and the need to eliminate the secondary radiation scattering from the object being imaged, requiring the use of complex mechanical grid arrangements. Because of their principle of operation, these grid arrangements also cause a doubling of the dose of radiation needed for imaging.

The narrow sensor used in scanning technology requires some mechanical support, but the costs involved are still considerably lower than those for a full-field sensor. Moreover, scanning imaging requires no grid, so the radiation dose applied to the object to be imaged is correspondingly halved. However, because of the small pixel size (high resolution) needed e.g. in mammography, it would still be necessary to use the TDI method and a sensor having a width of several pixels in order to obtain a sufficient signal with an X-radiation output of a practical magnitude. In state-of-the-art solutions, TDI imaging has generally been implemented using a CCD sensor for signal detection, but in an arrangement based on direct detection such a sensor would not, for the reasons explained above, be capable of reasonable transfer of the signal produced. On the other hand, another state-of-the-art method would be to read the signals detected by pixels connected to an X-Y matrix one at a time by turns, but in the light of the scanning speed and resolution involved in the present applications, this would require 12-bit A/D conversions and recording to be performed at a speed of about 1 ns, which is beyond the capabilities of the technology available today.

SUMMARY OF THE INVENTION

Consequently, the object of the present invention is to develop new solutions for improving the usability of sensors based on direct detection of X-radiation and especially to enable TDI imaging by using a new implementation of the technique of reading the detected signal. The present invention also includes a possibility of monitoring the signal strength during imaging in order to achieve an optimal exposure of the object to be imaged.

A significant part of the invention consists of a technology employed in devices known in themselves, such as Geiger counters, used e.g. in scientific physical research, according to which each quantum detected by the sensor is counted separately, specifically for the location and, id necessary, for the energy level as well. In prior art, some ideas about applying an approach like this to medical imaging well are known, but the solutions so far presented are technically extremely difficult to implement and therefore inapplicable as a basis for a practical and cheap implementation of a sensor solution suited for digital X-ray imaging.

Thus, the present invention aims at utilizing the best aspects of the sub-areas of the technologies described above to disclose an efficient high-resolution sensor solution that is easy to manufacture and is therefore cheap. The invention combines the above-described advantages associated with different imaging methods into a single whole which, in its various embodiments, may comprise a sensor that, in principle, has a 100-% quantum efficiency and is capable of handling the entire signal generated and eliminating the effects of so-called post-luminescence and is immune to scattered radiation, dark current and overexposure, eliminates thermal noise, is applicable for either full-field imaging or scanning narrow-beam imaging, and is capable of image information transfer at the required speed and, when necessary, also of resolving the energy levels of the detected radiation, thus also allowing a more detailed analysis of the object being imaged.

In other words, the invention is based on solutions known in themselves in which a biased (photoelectric) (semiconductor) material (e.g. Ge, Si, Se, GaAs, HgI, CdTe, CdZnTe, PbI) converts X-ray quanta directly into electron-hole pairs, each of which, by using an intensive electric field connected across said material, can be collected, avoiding lateral diffusion, into the area of its respective pixel, thus making it possible to achieve 100% dqe, yet without compromising on resolution. According to the invention, however, the image information produced by the X-ray quanta having penetrated the object to be imaged is not detected on the basis of the (electron) charge generated in the area of the pixel during imaging as in prior-art solutions but on the basis of principles known in other areas of physics by computing the pure number of detected X-ray quanta exceeding a possibly adjustable threshold level. By applying an adjustable threshold level, it is possible to define a minimum energy level for the quanta to be counted, so that thermal noise appearing in the sensor and lower-energy radiation or the like produced by scattered radiation or post-luminescence can be eliminated directly at pixel level.

BRIEF DESCRIPTION OF THE DRAWINGS

In the following, the invention will be described in detail by the aid of its preferred embodiments and with reference to the attached drawings, wherein FIGS. 5a and 5b illustrate a modular sensor arrangement according to a preferred embodiment of the invention.

DETAILED DESCRIPTION OF THE PREFERRED EMBODIMENTS

Figure 1:
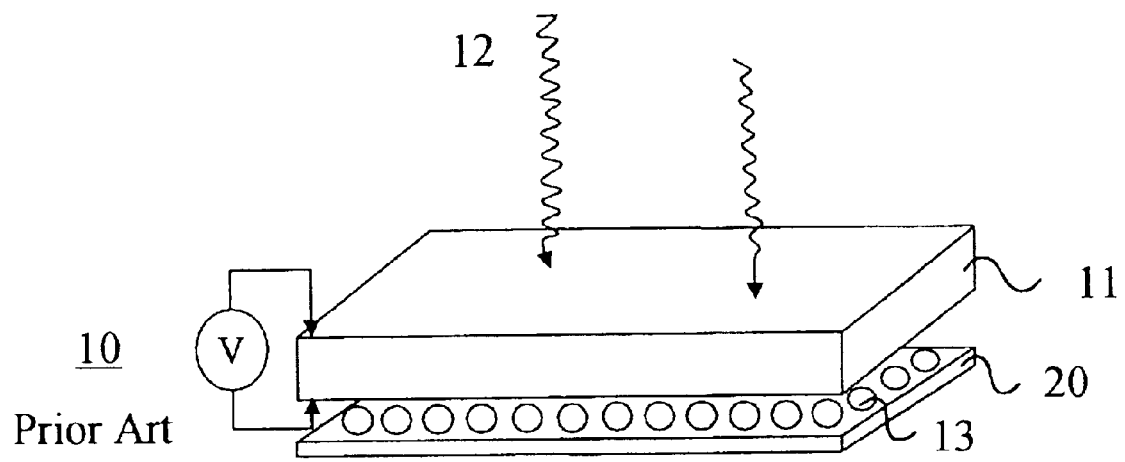
FIG. 1 illustrates the structure of a typical sensor based on direct detection of X-radiation.

FIG. 1 illustrates the basic structure of a typical sensor 10 based on direct detection of X-radiation, wherein the element 11 used for absorbing X-radiation 12 is a material layer having an area of X×Y and converting the radiation directly into an electrical signal, the material layer being placed in an intensive electric field V. The layer converting the radiation may consist of e.g. a relatively thin (semiconductor) material structure, (Ge, Si, Se, GaAs, HgI, CdTe, CdZnTe, PbI) with pixel electrodes arranged on the surface facing toward the X-radiation 12, the pixel electrodes covering the surface in a desired manner. Thus, for each pixel, the electric field collimates the signal generated and the signal can be detected e.g. by reading electronics 20 comprising a substrate having an area substantially equal to that of the absorbing element 11 and by a spherical indium junction 13 connected to each pixel electrode. The reading electronics may be implemented using e.g. CMOS technology.

Figure 2:
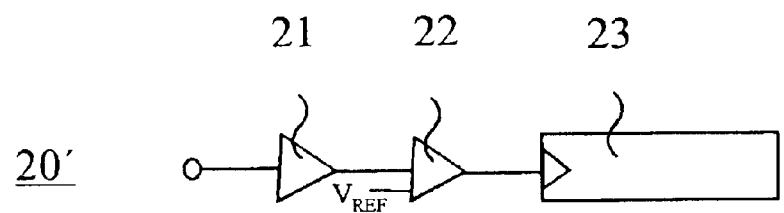
FIG. 2 presents an electronic detection circuit suited for use in the invention.

At pixel level, the detection electronics 20' comprised in the reading electronics 20 may comprise, as shown in FIG. 2, e.g. a signal amplifier 21 and a comparator 22, which either does or does not detect the quantum absorbed into the pixel area, depending on the reference level $V_{ref}$, which, if desired, may be externally adjustable. In addition, the solution presented in FIG. 2 comprises a preferably 12–16-bit digital counter 23, which counts each voltage or current pulse whose energy level exceeds the reference level. The counter 23 can be provided with a circuit for preventing counting after the counter has reached its maximum value, ensuring that overexposure will not produce any other error in the image except that the pixel signal being measured is at a maximum.

Figure 3:
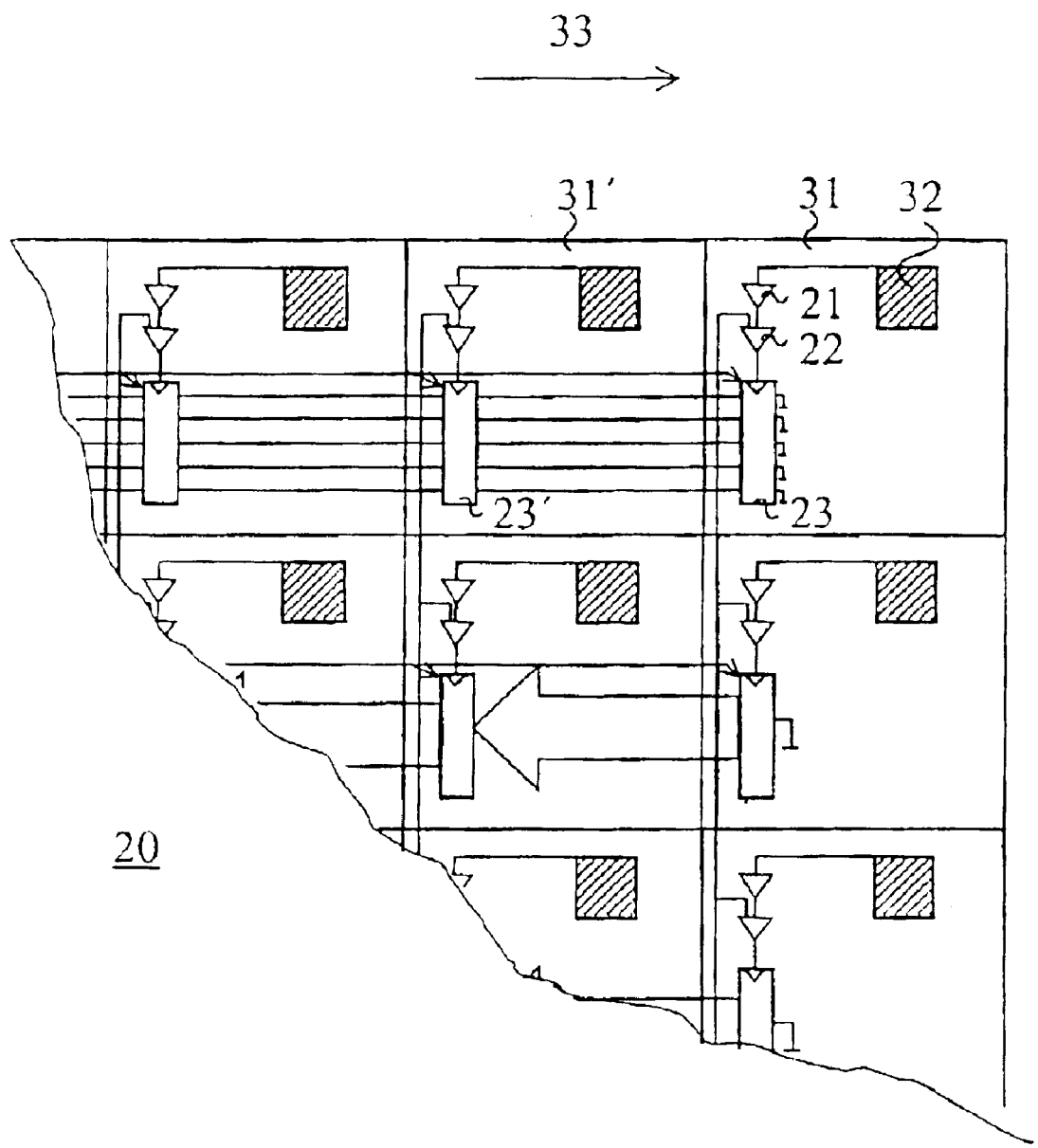
FIG. 3 presents a reading electronics solution according to the invention.

The reading electronics 20 of the invention may be implemented e.g. as illustrated in FIG. 3 by providing for each pixel 31, 31', . . . its own junction surface 32 and connecting the counters 23, 23', . . . to each other in a direction of the imaging scanning movement of the sensor 10 so that, to allow the results of the counters 23, 23', . . . . To be read out in as simple a manner as possible and at the same time to make TDI imaging possible, the counter 23', . . . for each pixel 31', . . . can be loaded in parallel from the counter 23, 23', . . . . For the pixel on the same row in the previous pixel column. The counters in the first column can be arranged to be reset to zero upon being loaded, so the sensor signals can be easily reset.

Figure 4:
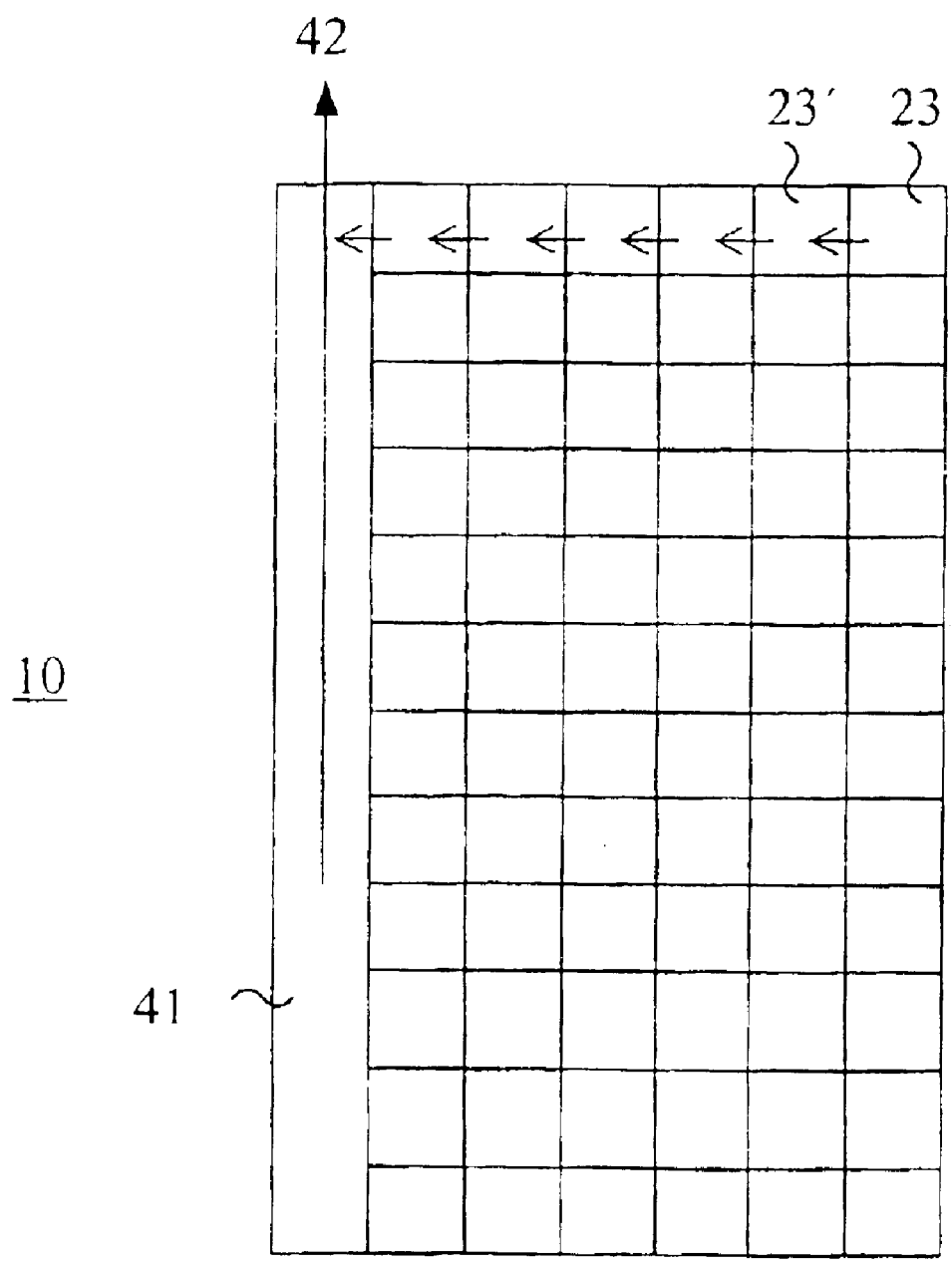
FIG. 4 presents a reading electronics solution according to the invention, considered at sensor level.

As shown in FIG. 4, the reading electronics 20 of the sensor 10 can be so implemented that the results of the outermost counters can be loaded in parallel into a shift register 41, in TDI imaging expressly a shift register placed on the side of the trailing edge of the sensor, shifting out the bits of one row in serial form in sequence. Thus, the sensor can be used for both full-field imaging and TDI imaging, with a minimum of only one output signal 42 being needed to output the image data produced by the sensor 10. Alternatively, serial data can be loaded into the beginning of the shift register 41 e.g. from a preceding identical sensor module 10 comprised in the same sensor arrangement, in which case the entire image information detected by the sensor system consisting of a number of separate modules can be read out via only one signal line.

Especially in stationary imaging, by implementing the loading of the values of the outermost counters into the shift register 41 as an autonomous function independent of the other counters, it will be possible to read out the values of this counter chain via the shift register 41 while the imaging and counting of quanta are simultaneously going on all the time. Such an arrangement can be used for continuous measurement of the detected signal and adjustment of optimal exposure of the object to be imaged without losing the value already counted. By loading the values of the outermost counters into the shift register 41 simultaneously in connection with parallel loading of all counters of the sensor 10, the sensor can be used for reading out the image data in TDI imaging and full-field imaging in the manner described above.

If a sufficiently small pixel size has been selected for use as the physical pixel size of the sensor, then it will be possible to combine pixel-specific signals read into larger entities e.g. in a computer arranged for image processing. The image signal can also be processed so as to increase the resolution of TDI imaging in the direction of the movement, making it possible to optimize the radiation dose/resolution required in the case of each individual object to be imaged, e.g. as described in FI patent 97665.

In the sensor of the invention, the lower-energy quanta produced by e.g. thermal noise or scattered radiation can be eliminated directly at pixel level by using an arrangement in which the reference level for the signal of each pixel column or preferably every second pixel column can be externally adjusted. This makes it possible e.g. in TDI imaging to have adjacent pixels imaged with different energy level resolutions by setting at each column transfer different reference levels between column pairs (or series), thus allowing one or more images adjusted to different energy levels to be obtained from almost the same point in the object. Using such images, a more accurate analysis of the object imaged will be possible.

The modular sensor arrangement of the invention can also be implemented e.g. by setting the reference level for every second sensor module to a level different from the reference level for the modules between them, thus making it possible to obtain information at two or even more different energy resolution levels about the same point in the object by the TDI method. Such information can be utilized for more detailed analysis of the object imaged.

By appropriately setting the reference level, it will also be easy to eliminate the so-called postluminescence described above, or partial propagation of the signal into the area of neighboring pixels, because the signal strength of these phenomena is of a marginal order as compared with the instantaneously detected signal, thus remaining below the threshold level of the signal to be detected. In this way, compensation of the phenomena problematic in state-of-the-art solutions is possible without the use of complicated computer algorithms.

It is naturally possible to connect to each pixel two or more electronic detection circuits e.g. as illustrated in FIG. 2 in parallel, in which case e.g. two reference levels can be set for each pixel. Via such an arrangement, it is again possible to produce images consistent with two different minimum energy levels by a single imaging operation to allow a more detailed analysis of the object imaged.

As a detail regarding the implementation of the sensor, let it be mentioned that the reference energy level for the quanta to be detected which is needed in the electronic circuit for each pixel is delivered to the circuit in the form of a current signal, which is only converted into a voltage level at the pixel in question or locally in the area of a few pixels. Thus, the accuracy of the analog voltage level will not be affected by any ground potential disturbances that may arise from other activities of the circuit.

If desired, it is also possible to connect to the end of each readout row an adder circuit which sums a desired number of numeric pixel values before their being loaded into the shift register. If an identical adder is also connected to the output end of the shift register to sum a desired number of numeric pixel values that can be read out, the sensor circuit can be used to implement binning, i.e. combination of pixels in X and Y directions to form larger pixels.

FIG. 5a presents a practical sensor module solution for forming a TDI sensor 50 applicable for use in scanning imaging. The sensor 50 may consist of e.g. four sensor module columns 51, 52, 53, 54 arranged successively in the scanning direction 33. In each column, individual sensor modules 510, 510', . . . 520, 520', . . . 530, 530', . . . 540, 540', . . . are placed in somewhat different positions in the transverse direction relative to the scanning movement so that any junctures in the sensor surfaces in each column are set at slightly different heights. This ensures that any gaps that may appear between modules will still be imaged via the other three sensor columns and no gaps are left in the image produced. The overlapping can be implemented e.g. using a multiple of the pixel size of the sensor module with the addition of a proportion of the pixel size depending on the number of sensor modules engaged in the image forming process in the scanning direction, the proportion being determined by the formula $d_{pix} \times (n+1/m)$, where $d_{pix}$= diameter of pixel, n=integer and m=number of modules in the relevant direction or an integer smaller than this, the imaging resolution of the sensor being thus increased by signal processing functions beyond the physical pixel size of the sensor module.

Corresponding overlaps and distances between modules can also be implemented between sensor modules arranged successively in the scanning direction, thus correspondingly increasing the resolution in the scanning direction as well. On the other hand, in the scanning direction, a corresponding effect can also be achieved by a method obvious to a person skilled in the art, by clocking different sensor modules in a corresponding manner.

E.g. in mammography applications, an individual module could consist of 142×284 pixels having a size of 35 μm, forming a sensor surface having an area of 5 mm×10 mm, so the number of such modules comprised in the sensor array as a whole could be four in the widthwise direction and about 20 in elevation to form a sensor having a width of about 20 mm and a height of about 180 mm or 240 mm.

The gaps between sensor modules should be kept as small as possible, on the one hand in consideration of the physical dimensions of the sensor arrangement, and on the other hand to allow the imaging time needed for carrying out the scanning movement to be kept as short as possible in order to avoid any problems that might arise as a result of non-uniform production of radiation by the radiation source or in consequence of the object being imaged moving during the imaging scanning action. In regard of the actual generation of a continuous image, the distance between the modules is not a critical factor. For instance, in accordance with the above description referring to FIG. 4, a shift register can be placed at one of the vertical edges of each sensor module without the space occupied by it causing any essential impediment to the imaging process. However, it is advisable to protect such a shift register against X-radiation e.g. by covering it with a protective layer of the same absorbing material as is used to protect the reading electronics, from which layer any charges appearing in the area of the shift register can be discharged.

FIG. 5b visualizes how each module 510, 510', . . . can be placed in a position substantially perpendicular to the focus of the ray beam 12 used in the imaging process.

When such a structure consisting of a number of separate sensor module columns arranged one after the other in the scanning direction is used, especially in TDI imaging, the scanning speed or other parameters relating to exposure can be adjusted on the basis of the signal obtained from the module column moving foremost in the scanning direction so that the sensors in the subsequent module columns will have an optimal exposure.

Figure 6:
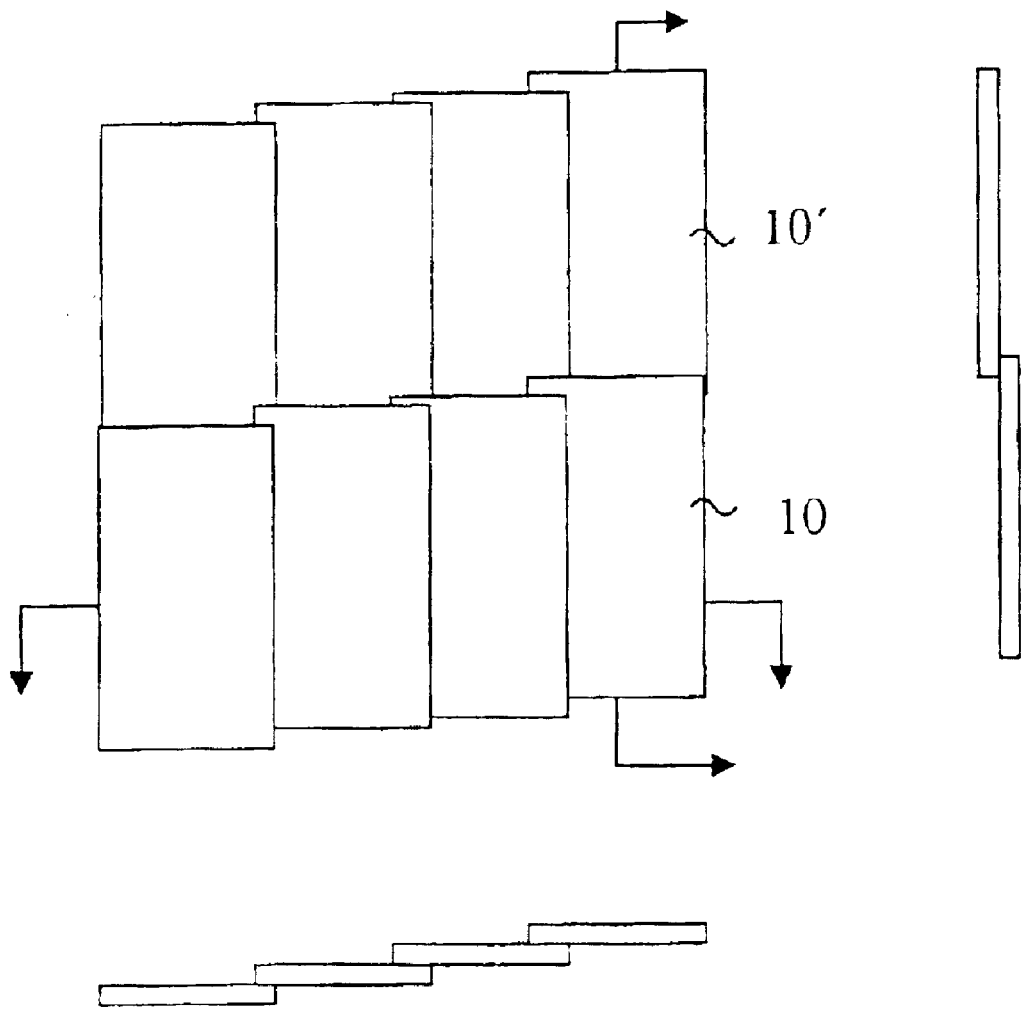
FIG. 6 presents a modular sensor arrangement according to a second preferred embodiment of the invention.

FIG. 6 illustrates a possible arrangement of overlapping sensor modules, with sensor modules 10, 10', . . . as described above combined to form a larger continuous image area, as seen from the focus of the radiation source, without any gaps left between modules.

Figure 7:
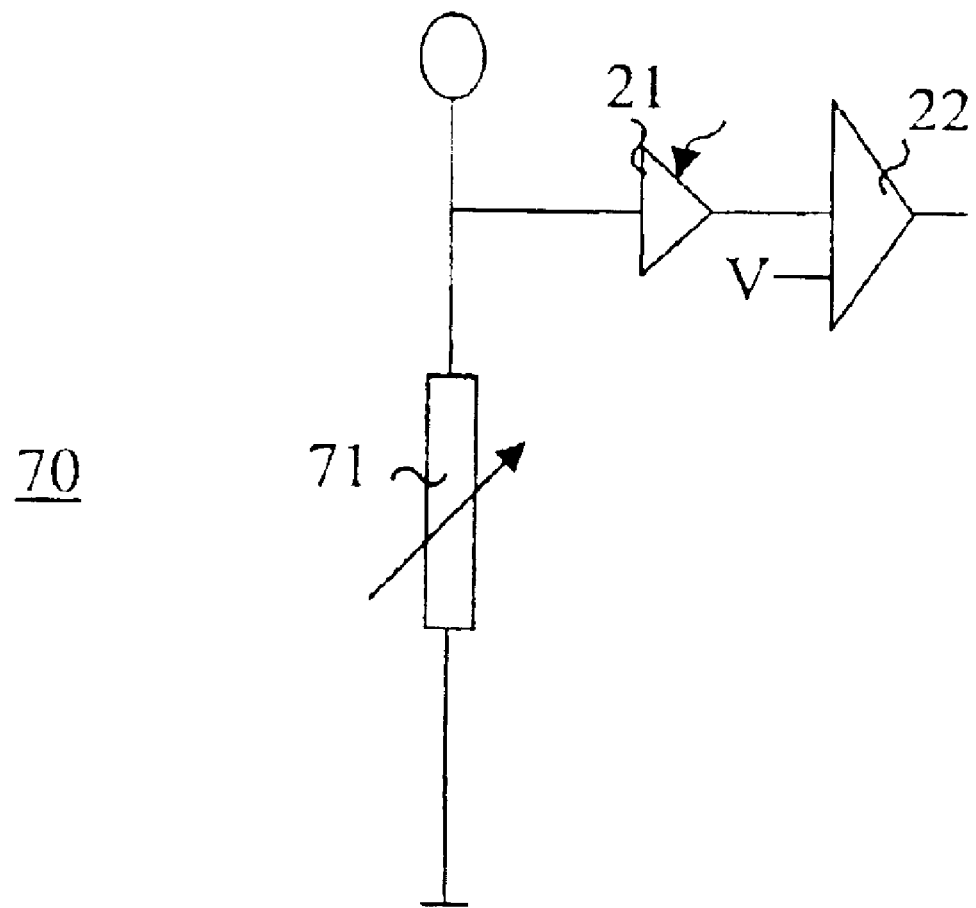
FIG. 7 presents an electronics arrangement suited for use in the invention, designed for adjustment of the minimum energy level of an X-ray quantum to be detected by a pixel.

As explained above, the electronics used in the invention allows the reference energy level for the detected quanta to be set to a desired magnitude. This can be implemented e.g. using a detection circuit 70 as presented in FIG. 7, by keeping the input voltage threshold V for each pixel constant and adjusting the input impedance 71 or gain 21 of the input circuit of the detection electronics for each pixel correspondingly.

The detection technology based on the number of quanta as used in the invention further differs to its advantage from traditional systems measuring the electron charge accumulated on pixels on account of its perfect linearity as it does not require the use of any analog signal amplifiers, in which the amplification factor typically falls as the signal strength increases. In the technology of the invention, the contrast resolution of image information is the same regardless of signal strength.

A preferred area of application of the invention is mammography, where typically the number of quanta accumulated on a 35 μm pixel is 8000 quanta/s and at its maximum, without an object in between, about 200 000 quanta/s. To have the quanta separated from each other, i.e. to have them counted each one separately with a sufficient accuracy despite their stochastic occurrence, the reading electronics should have a frequency response of the order of a few MHz, as is customary even in modern technology.

In the use of the technology of the invention for TDI imaging, a central factor is the rate at which the information is read out. In mammography imaging, a distance of 240 mm is typically scanned in three seconds, which means that the system has to be able to read the 35 $\mu$m pixel rows at least at intervals of 430 $\mu$s. If the sensor is so implemented that it comprises e.g. 142 columns and 284 rows and if 12-bit counters are used, then within this time the system has to read 284×12 bits (=3408), which would mean a read frequency of 8 MHz. Correspondingly, reading 16-bit information would require a 10.5-MHz read frequency. Such frequencies are also normal in current technology.

To maximize the resolution, when the technology of the invention is used, the counting action of the counters should be stopped for the time it takes to transfer their information into the counters of the next column, because otherwise quanta that are read during the transfer might incidentally be counted into one or the other of the counters for the two pixels. To avoid losing any quanta during this time, the transfer time should be sufficiently short. For instance, at a normal 10 MHz rate, the amount of quanta lost would be about 2% in the case of the maximum radiation rate described above, and 0.1% in a typical case of imaging. As current technology permits the use of rates multiple times higher than this, the number of quanta that may be lost during the transfer will be practically insignificant.

Although the invention has been described above by way of example in the first place with reference to mammography applications, it can naturally also be used in connection with any other corresponding imaging application. On the other hand, it is obvious to a person skilled in the art that, especially with the progress of technological development, the fundamental idea of the invention can be implemented in may different ways and that its embodiments are not limited to the examples described above but may instead be varied within the scope of protection defined in the following claims.

What is claimed is:

1. A sensor arrangement in digital X-ray imaging, said arrangement comprising:
   at least one sensor element which absorbs X-radiation and contains a medium converting X-ray quanta into electron-hole pairs, in which element a surface opposite to a surface receiving radiation is provided with electrodes for dividing the sensor element into at least two pixel columns,
   means for applying an electric field across the medium for passing, while avoiding lateral diffusion, charges generated during absorption to the nearest electrode forming a pixel, each pixel electrode being provided with detection electronics and a counter for counting the voltage or current pulses generated by said electron-hole pairs, wherein the counters for adjacent pixel columns are connected to each other so that the counters for the pixels can be loaded from the counter for the corresponding pixel on the same row in the preceding pixel column.

2. The sensor arrangement as defined in claim 1, wherein the function of reading the values of the counters in the last column is implemented as an autonomous function independent of the other counters.

3. The sensor arrangement as defined in claim 1, wherein the detection electronics is implemented as part of reading electronics comprising a silicon-based substrate.

4. The sensor arrangement as defined in claim 1, wherein the detection electronics comprises means for adjusting or setting a minimum energy level for the pulses to be detected.

5. The sensor arrangement as defined in claim 4, wherein the detection electronics comprises a pixel electrode, an amplifier and a comparator.

6. The sensor arrangement as defined in claim 5, wherein said means for adjusting or setting the minimum energy level for the pulses to be detected comprise means for keeping the input voltage threshold of the comparator comprised in the detection electronics constant and means for adjusting the input impedance or gain of its input circuit.

7. The sensor arrangement as defined in claim 4, further comprising:
   externally adjustable means for setting different reference levels for different pixels.

8. The sensor arrangement as defined in claim 4, further comprising:
   means for delivering a signal defining the minimum energy level as a current signal and means for converting said signal at the pixel or locally in the area of a few pixels into a voltage level.

9. The sensor arrangement as defined in claim 4, wherein said at least one sensor element comprises at least two sensor elements.

10. The sensor arrangement as defined in claim 9, wherein the sensor elements are connected in series so that information to an input end of the shift register of every subsequent sensor module can be loaded from the previous sensor element comprised in the sensor arrangement.

11. The sensor arrangement as defined in claim 9, wherein the sensor elements are arranged in a configuration such that said elements are overlapping.

12. The sensor arrangement as defined in claim 9, wherein the sensor elements are arranged in an overlapping configuration so that they cover a continuous image area as seen from a focus of the radiation source.

13. The sensor arrangement as defined in claim 9, wherein the sensor elements are arranged in a number of columns and that a different reference level for the signal to be detected has been set for the pixels in every second column.

14. The sensor arrangement as defined in claim 9, further comprising:
   means for adjusting one or more parameters relating to exposure on the basis of the signal received from the first sensor module column.

15. The sensor arrangement as defined in claim 1, wherein there are two circuits, each containing detection electronics and a counter, connected to the pixel electrode.

16. The sensor arrangement as defined in claim 1, further comprising:
   a shift register disposed at an edge of said silicon-based silicon substrate element, in particular at its trailing edge in the case of a sensor arrangement used for scanning imaging.

17. The sensor arrangement as defined in claim 16, further comprising:
   an adder circuit placed between the pixel of each outermost pixel column and the shift register and/or at the output end of the shift register.

18. The sensor arrangement as defined in claim 16, further comprising:
   a radiation absorbing covering structured and arranged to protect said shift register against X-radiation.

19. A method in digital X-ray imaging, comprising the steps of:

absorbing X-radiation by at least one sensor element including a medium for converting X-ray quanta into electron-hole pairs, arranging electrodes on a surface opposite to a surface for receiving said radiation for dividing said sensor element into at lest two pixel columns, and applying an electric field across said sensor element for directing, while avoiding lateral diffusion, charges generated during absorption to the nearest electrode forming a pixel and further to a counter for counting the voltage or current pulses generated by said electron-hole pairs, wherein a signal read by the counters is loaded, from column to column, into the counters for corresponding pixels on the same rows in the next pixel column.

20. The method as defined in claim 19, wherein the values of the counters in the last column are read out while the process of imaging and counting of quanta is going on.

21. The method as defined in claim 19, wherein the signal is read out via a shift register placed beside the last pixel column.

22. The method as defined in any claim 21, wherein the signal from the counters in the pixel rows is summed before being passed to the shift register and/or that the signal is summed while being read out from the shift register.

23. The method as defined in claim 19, wherein only pulses exceeding a set reference level are passed to the counter.

24. The method as defined in claim 23, wherein the pulse to be passed to the counters is detected by a circuit comprising a pixel electrode, an amplifier and a comparator.

25. The method as defined in claim 23, wherein the minimum energy level of the pulses to be passed to the counter is controlled by keeping the input voltage threshold of the comparator connected to the counter constant and adjusting the input impedance or gain of the input circuit of the comparator electronics.

26. The method as defined in claim 23, wherein a reference energy level for quanta to be detected is delivered as a current signal which is converted at the pixel or locally in the area of a few pixels into a voltage level.

27. The method as defined in claim 19, wherein when the counters are being loaded, a zero value is loaded into the counters for the pixels in the first column.

28. The method as defined in claim 19, wherein the counters are loaded either during an imaging scanning movement or after a full-field imaging process.

29. The method as defined in claim 19, wherein the imaging is performed using at least two sensor elements.

30. The method as defined in claim 29, wherein the signal obtained from a given element is read out via the shift register of at least one other element.

31. The method as defined in claim 29, wherein the reference level for the signal to be detected is adjusted to a desired value separately for each pixel, pixel column or sensor element column.

32. The method as defined in claim 29, wherein at least two sensor element columns are used and the signal is read out at least from the first column, said signal obtained from the first column being used for the adjustment of one or more parameters relating to exposure.

* * * * *